Sept. 13, 1960 W. S. FERRIS ET AL 2,952,798
SOURCE OF POTENTIAL FOR PHOTOGRAPHIC FLASH HOLDER
Filed June 12, 1958

WARREN S. FERRIS
JAMES R. FISHER
INVENTORS

BY
ATTORNEYS

United States Patent Office 2,952,798
Patented Sept. 13, 1960

2,952,798

SOURCE OF POTENTIAL FOR PHOTOGRAPHIC FLASH HOLDER

Warren S. Ferris and James R. Fisher, Webster, N.Y., assignors to Eastman Kodak Company, Rochester, N.Y., a corporation of New Jersey Filed June 12, 1958, Ser. No. 741,655

4 Claims. (Cl. 315—205)

The present invention relates to a source of potential for firing a photoflash lamp and comprising a capacitor adapted to be discharged across the lamp to fire the same and an alternating current generator for charging the capacitor.

It is well known in the flash synchronizer art to use a battery and capacitor combination as a source of potential to fire the flash lamp when a flash switch is closed. In such a system the battery serves to charge up the capacitor which is then discharged across the flash lamp when the flash switch is closed. The batteries in such systems have always presented a problem because as they become weaker, the charging time of the capacitor increases and slows the rate at which pictures can be taken and they eventually have to be replaced either because of overuse or failure due to excessive age.

U.S. patent application Serial No. 739,353, filed June 2, 1958, shows a flash circuit wherein the batteries have been replaced by a small alternating current generator which can be manually operated to place a charge on the capacitor which is then discharged across the flash lamp to fire the same. In this system a half-wave rectifier is connected in series with the generator and capacitor to obtain the same result as would be obtained by the use of commutators on the generator but with a much simpler generator construction.

While this alternating current generator and rectifier system works very satisfactorily to charge the capacitor, it has certain disadvantages or shortcomings. First of all, if the operator operates the generator an excessive amount to be sure that the capacitor is sufficiently charged, he might damage the rectifier due to excessive inverse voltage being applied thereto. Secondly, excessive operation of the generator would tend to place a charge on the capacitor which would exceed its rating. And finally, the operator has no way of knowing when a sufficient charge is on the capacitor to fire a flash lamp.

The primary object of the present invention is to improve the above-mentioned generator-capacitor system for flash circuits which overcomes said noted disadvantages and shortcomings.

Another object is to connect a discharge tube in shunt with the half-wave rectifier which will discharge at such a voltage as to prevent damage to the rectifier due to excessive inverse voltage and prevent charging of the capacitor above its rated voltage no matter how much the generator is operated.

And still a further object is to connect a neon lamp in shunt with the rectifier so that when it ionizes it will give a visual indication of a sufficient charge being on the capacitor to fire a flash lamp.

And a further object is to provide a device for charging a capacitor to be used as a source of energy in which the capacitor is charged from an alternating current generator through a half-wave rectifier and a neon lamp is connected in shunt with the rectifier to prevent damage to the rectifier due to excessive inverse voltage being applied thereto.

The novel features that we consider characteristic of our invention are set forth with particularity in the appended claims. The invention itself, however, both as to its organization and method of operation, together with additional objects and advantages thereof, will best be understood from the following description when read in connection with the following drawings, in which:

Figure 2:
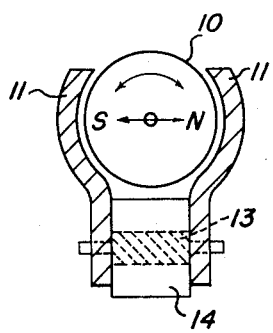
Figs. 2 and 3 are a vertical sectional view and a side elevational view, respectively, of an alternating current generator assembly used to charge the capacitor.
Figure 3:
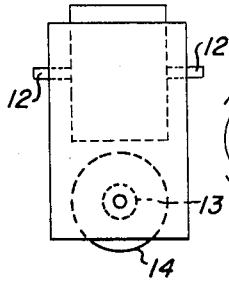

Looking now at Figs. 2 and 3, the alternating current generator used for charging a capacitor in accordance with a preferred embodiment of the present invention may comprise a cylindrical barium ferrite 2-pole magnet 10, polarized across its diameter, which is rotated between two soft iron pole pieces 11. The stud shafts 12 of the magnet 10 will be suitably journalled in bearings, not shown, and have means connected to one of the shafts so that the magnet may be spun by a spring, not shown, or by hand, as disclosed in the above-noted pending patent application Serial No. 739,353. The soft iron core 13 of a coil 14 provides a magnetic circuit between the pole pieces and the magnetic flux through this core which is caused by rotating the magnet generates an alternating voltage in the coil.

Figure 1:
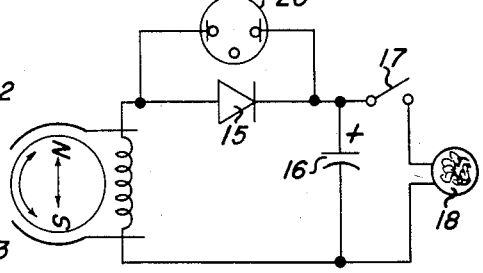
Fig. 1 is a schematic diagram of a complete flash holder circuit constructed in accordance with the present invention.

Referring now to Fig. 1, the alternating current produced by the generator is rectified by a half-wave rectifier 15 and is used to charge an electrolytic capacitor 16. The rectifier also serves to block the discharge of the capacitor back through the generator when rotation of the magnet ceases. Closure of the flash switch 17, which is usually built into a camera shutter, after the capacitor is sufficiently charged, discharges the capacitor through the flash lamp 18 placed in the socket of a flash holder and ignites it. Up to this point the flash circuit is essentially the same as that disclosed in the copending application Serial No. 739,353.

Figure 4:
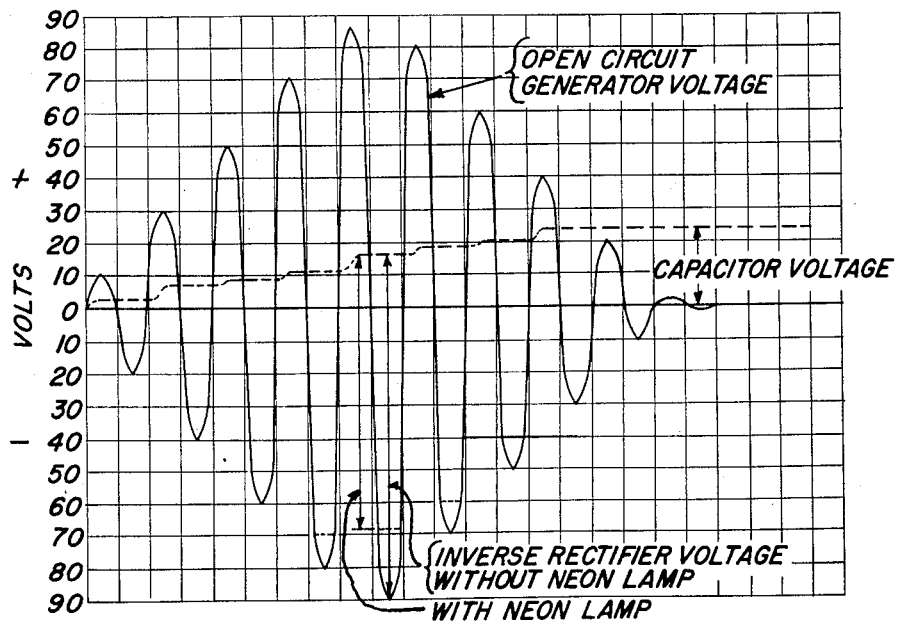
Fig. 4 is a graph showing the wave forms generated during a typical spin of the generator.

Looking now at Fig. 4, the solid line represents the open circuit voltage produced by the generator. The broken line represents the voltage developed on the capacitor 16. The inverse voltage to which the rectifier is subjected is the sum of the voltage between the negative open circuit generator voltage and the voltage on the capacitor. For a hard spin, the open circuit generator voltage reaches about 85 volts peak and the capacitor charges to about 25 volts. This results in a peak inverse voltage on the rectifier of about 100 volts for a single hard spin because the full 25 volts is not developed on the capacitor at the time the generator reaches its maximum open circuit voltage. However, with repeated hard spinning, the capacitor can be charged to 55 volts and this charge does exist when the generator reaches its peak output voltage. This results in an instantaneous peak inverse voltage of about 140 volts across the rectifier which can be damaging if continued.

In accordance with the present invention, a discharge tube 20 is connected in shunt with the rectifier 15 to prevent this excessive inverse peak voltage from being applied to the rectifier. This discharge tube should be one that breaks down and discharges at about 80 volts in the present application, because the rectifier we have found particularly useful in this application is a germanium diode having a rated inverse voltage of about 80 volts. While certain half-wave rectifiers are available having a higher inverse voltage rating than this, a germanium diode is deemed advisable for this particular application because it has a lower return current characteristic than a selenium rectifier, and thus prevents excessive discharging of the capacitor during charging and during rest periods of the generator, is very small in size and is relatively inexpensive. The effect of this discharge tube is to limit the negative voltage which can be applied to the rectifier by the generator, as shown by the dotted line in Fig. 4; the total inverse voltage cannot exceed 80 volts so the point at which clipping occurs becomes lower as the capacitor charges. Another advantage is gained by this use of a discharge tube. The breakdown of the tube slightly discharges the capacitor and even on repeated spins of the generator prevents the capacitor voltage from exceeding its rating, in this application approximately 35 volts.

If a neon lamp is chosen as the discharge tube, a third advantage is derived. As the neon lamp ionzies and discharges, it will serve as a visual charge indicator and the operator will be assured of at least a 12 volt charge on the capacitor if he spins the generator enough to ionize the lamp. A 12 volt charge on the capacitor is more than sufficient to fire a conventional flash lamp 18 when the flash switch 17 is closed.

While we have disclosed our invention as constituting the source of potential for a photographic flash holder, it will be readily apparent that its use is not limited to this particular application. Such a source of potential can be used in many cases where it is desired to use a high intensity current for a short period, the capacitor being used as the source of energy and being charged from an alternating current generator through a half-wave rectifier which needs to be protected against damage due to excessive inverse voltage.

While we have shown and described certain specific embodiments of our invention, we are aware that many modifications thereof are possible. Our invention, therefore, is not to be limited to the precise details of construction shown and described but is intended to cover all modifications coming within the scope of the appended claims.

Having thus described our invention, what we claim as new and desire to secure by Letters Patent of the United States is:

1. A source of potential for firing a photoflash lamp comprising a capacitor adapted to be discharged across a flash lamp when a flash switch in series with the flash lamp and capacitor is closed; an alternating current generator connected across said capacitor; a half-wave rectifier having a given inverse voltage rating connected in series with said generator and capacitor; a gaseous discharge tube connected in shunt with said rectifier and adapted to discharge at a voltage approximating the rated inverse voltage of the rectifier whereby said tube prevents damage to the rectifier due to excessive inverse voltage.

2. A source of potential for firing a photoflash lamp according to claim 1, in which said discharge tube is a neon lamp whereby it serves as a visible indicator of the charge on the capacitor as well as a protector for the rectifier.

3. A circuit for firing a photoflash lamp comprising in combination a flash lamp socket, a capacitor connected across said socket; a normally open flash switch connected in series with said capacitor and socket adapted when closed to discharge said capacitor through a lamp placed in said socket; an alternating current generator connected across said capacitor to charge the same; a half-wave rectifier connected in the charging circuit in series with said capacitor; and a neon lamp connected in shunt with said rectifier and adapted to ionize at a voltage approximating the rated inverse voltage of the rectifier whereby said neon lamp prevents damage to the rectifier due to excessive inverse voltage and serves as a visible indicator that the capacitor has a given minimum charge on it.

4. A capacitor charging circuit comprising a capacitor to be charged; an alternating current generator connected in circuit with the capacitor; a half-wave rectifier having a given inverse voltage rating connected in series with the capacitor and generator; and a gaseous discharge tube connected in shunt with said rectifier and adapted to discharge at a voltage approximating said rated inverse voltage of the rectifier whereby said tube prevents damage to the rectifier due to excessive inverse voltage.

References Cited in the file of this patent

UNITED STATES PATENTS

| | | |
|---|---|---|
| 2,721,959 | Nessel | Oct. 25, 1955 |
| 2,763,812 | McKinney | Sept. 18, 1956 |